(12) United States Patent
Yoshii et al.

(10) Patent No.: US 10,345,971 B2
(45) Date of Patent: Jul. 9, 2019

(54) DISPLAY DEVICE

(71) Applicant: Japan Display Inc., Tokyo (JP)

(72) Inventors: Takashi Yoshii, Tokyo (JP); Jin Ota, Tokyo (JP)

(73) Assignee: Japan Display Inc., Tokyo (JP)

( * ) Notice: Subject to any disclaimer, the term of this patent is extended or adjusted under 35 U.S.C. 154(b) by 491 days.

(21) Appl. No.: 15/138,497

(22) Filed: Apr. 26, 2016

(65) Prior Publication Data

US 2016/0364046 A1     Dec. 15, 2016

(30) Foreign Application Priority Data

Jun. 15, 2015   (JP) .................................. 2015-120212

(51) Int. Cl.
*G09G 3/36* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G09G 3/36* (2013.01); *G09G 2330/028* (2013.01)

(58) Field of Classification Search
CPC ...... G06F 3/0412; G06F 3/0416; G06F 3/044; G09G 3/3648; G09G 2354/00
See application file for complete search history.

(56) References Cited

U.S. PATENT DOCUMENTS

| 6,924,782 | B1* | 8/2005 | Fujioka | G09G 3/3688 345/100 |
| 2006/0232539 | A1* | 10/2006 | Hashimoto | G09G 3/3688 345/96 |
| 2009/0153547 | A1* | 6/2009 | Chen | G09G 3/3688 345/215 |
| 2014/0168151 | A1 | 6/2014 | Noguchi et al. | |
| 2016/0216833 | A1* | 7/2016 | Butler | G06F 3/0412 |

FOREIGN PATENT DOCUMENTS

JP     2014-119919 A     6/2014

* cited by examiner

*Primary Examiner* — Bryan Earles
(74) *Attorney, Agent, or Firm* — Michael Best & Friedrich LLP

(57) ABSTRACT

According to one embodiment, a display device includes a display panel, switching elements, a power supply, a controller and a noise suppression circuit. The display panel displays an image. The switching elements supply a pixel signal to the display panel. The power supply supplies a power source voltage to the switching elements. The controller switches between a display period during which the display panel displays an image and a non-display period during which the display panel does not display an image. The noise suppression circuit preliminarily reduces a potential difference between the switching elements and the power supply when the controller switches between the display period and the non-display period.

13 Claims, 12 Drawing Sheets

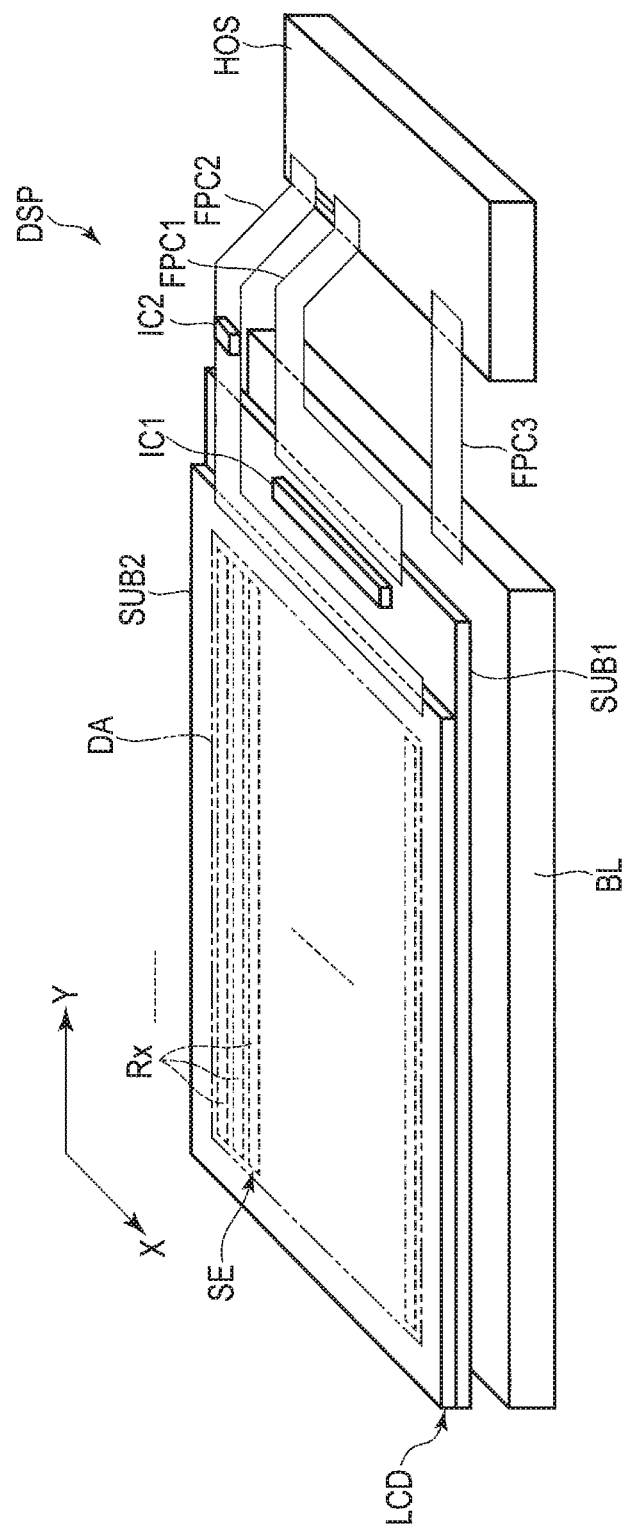
F I G. 1

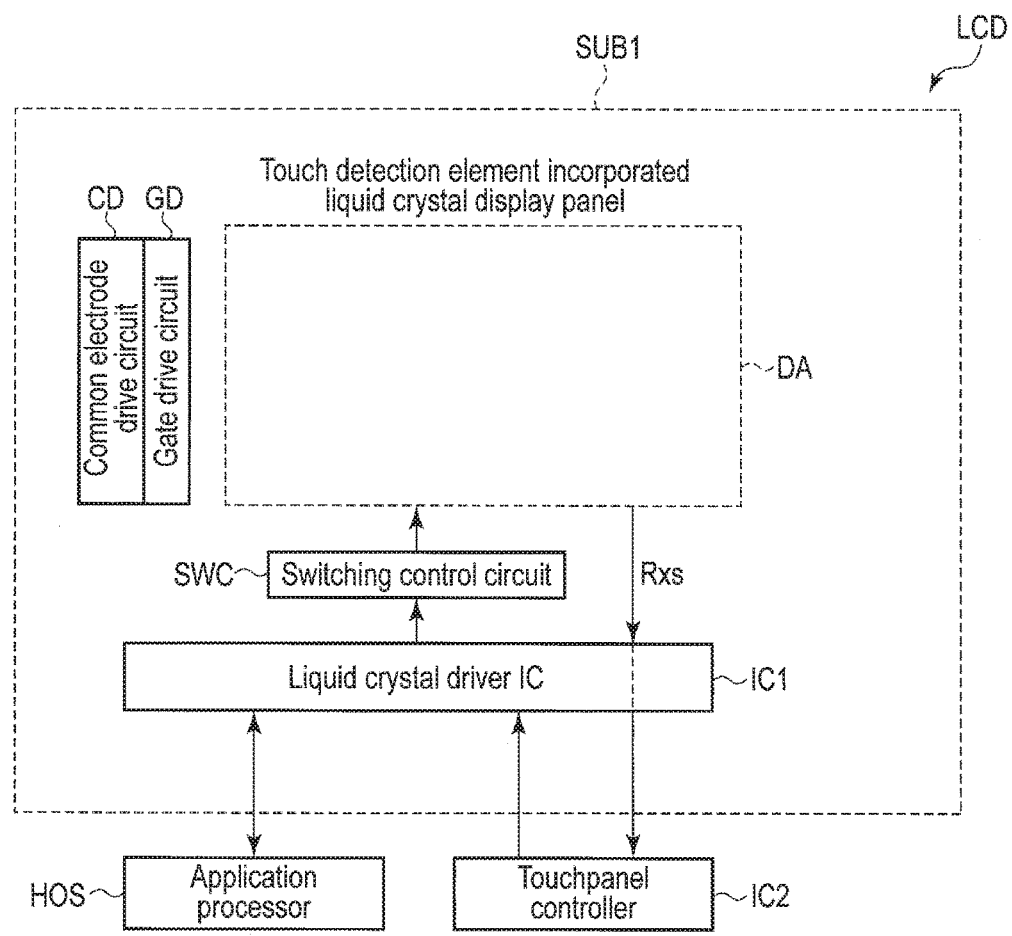
F I G. 2

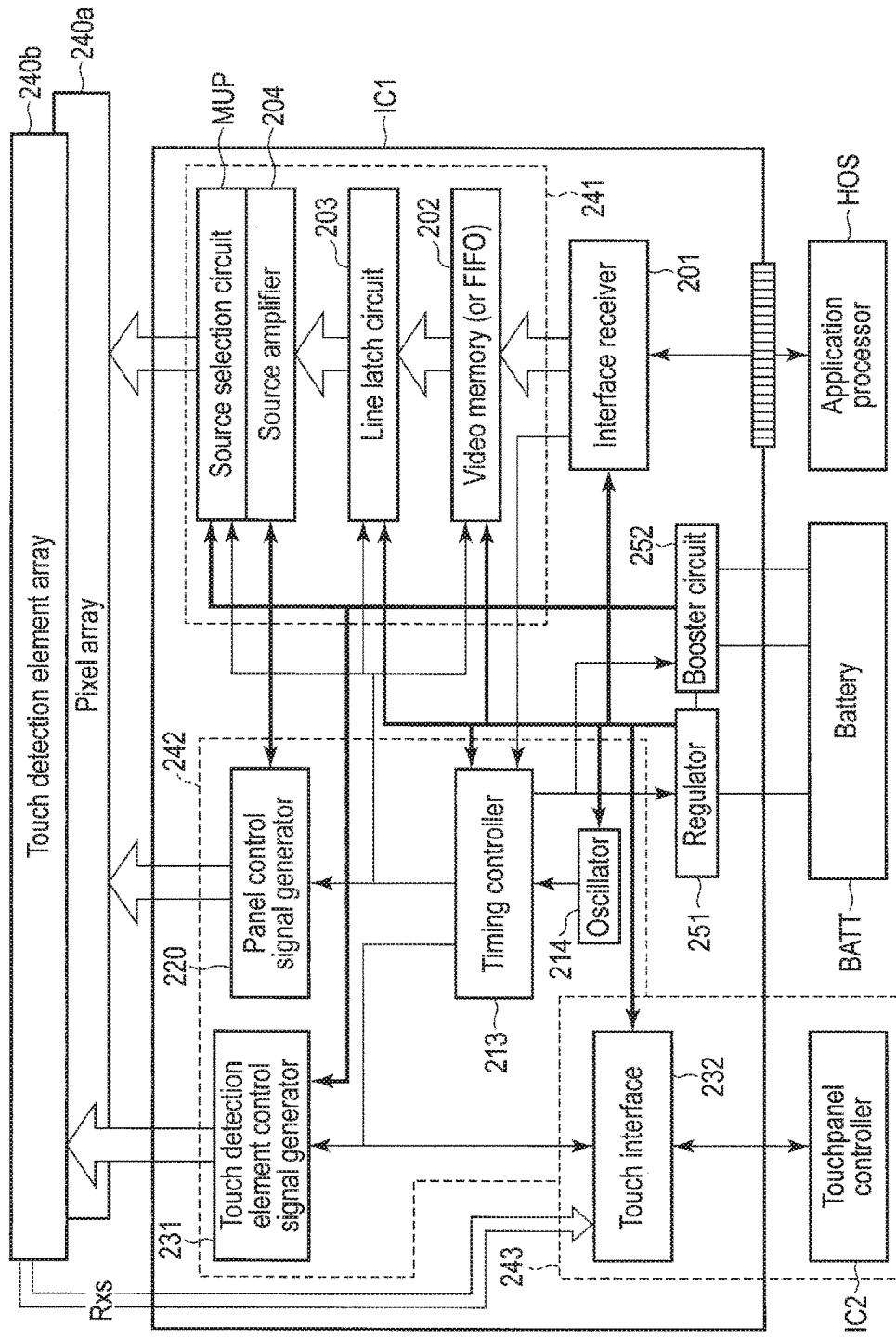
F I G. 6

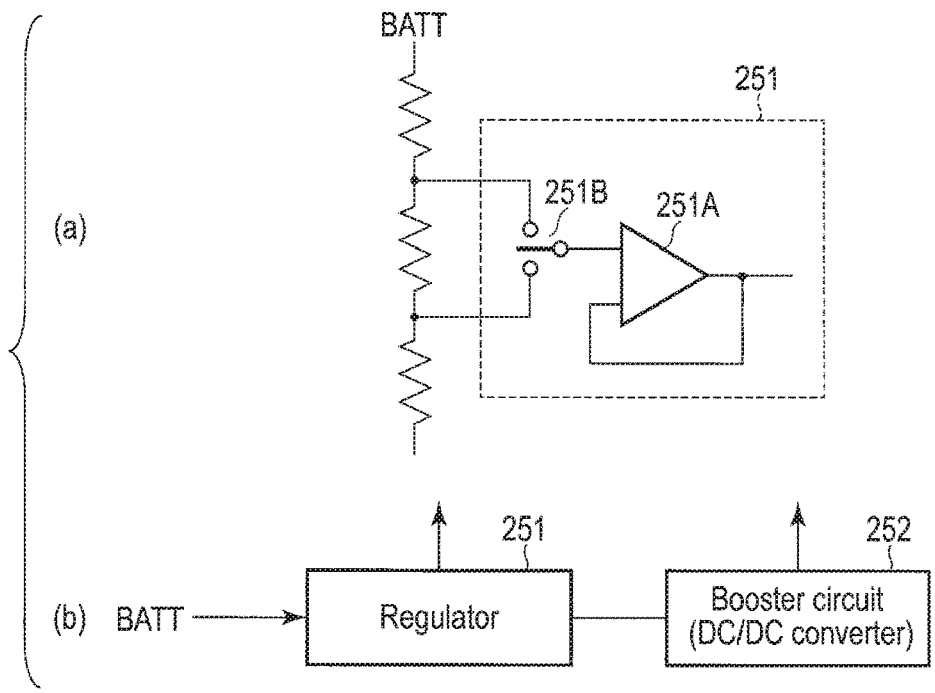
F I G. 7
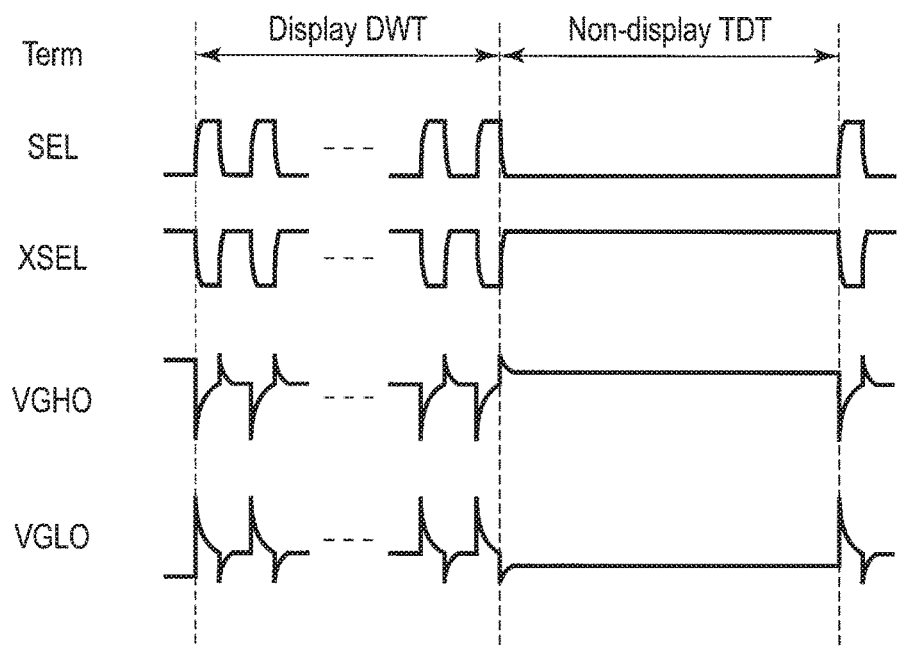
F I G. 10

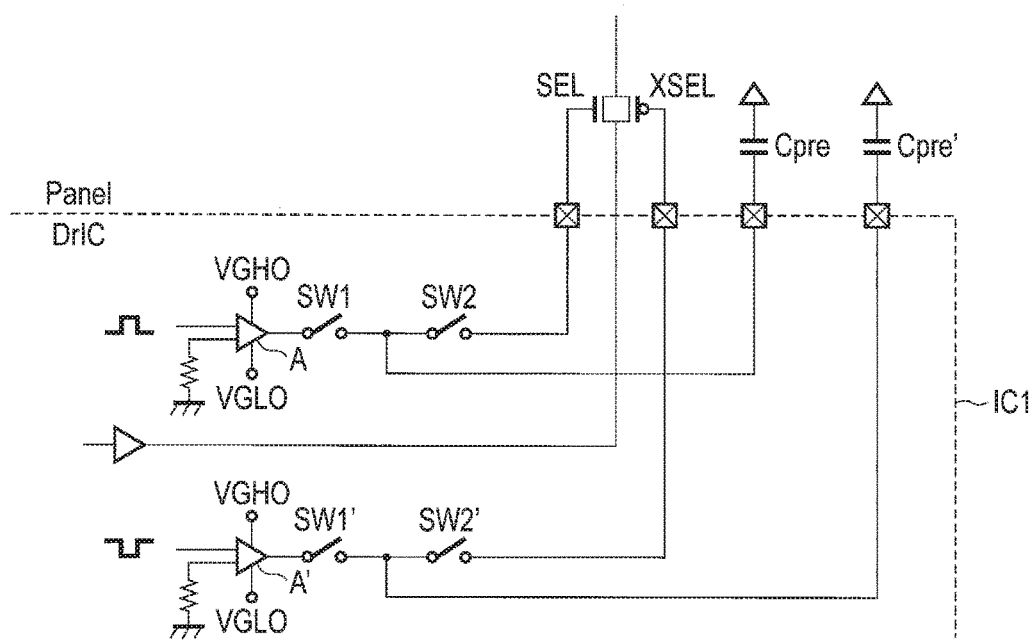
F I G. 12
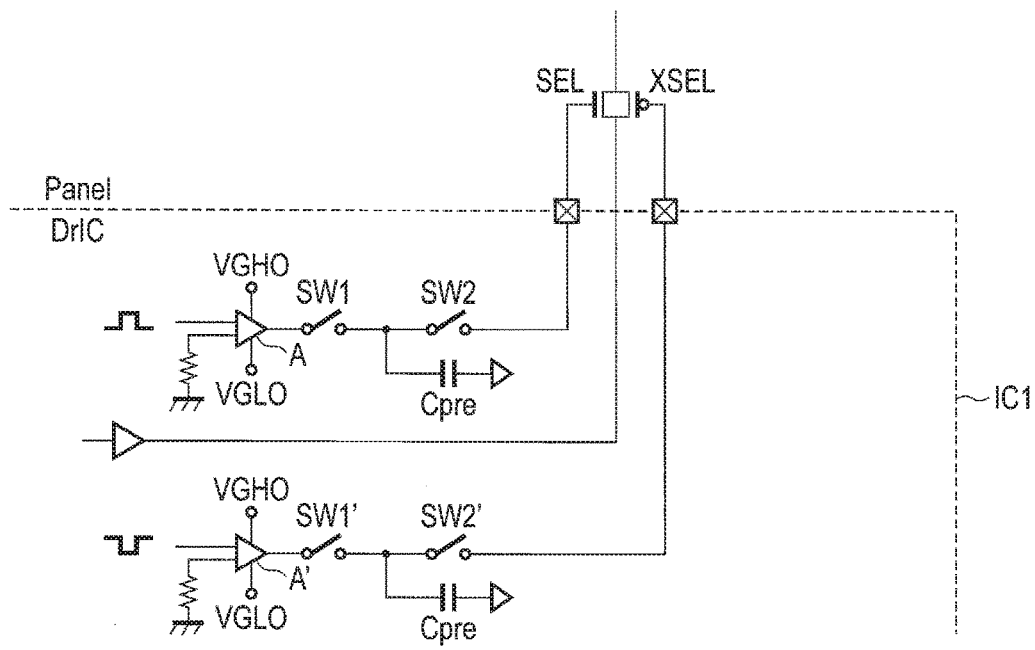
F I G. 13

DISPLAY DEVICE

CROSS-REFERENCE TO RELATED APPLICATIONS

This application is based upon and claims the benefit of priority from Japanese Patent Application No. 2015-120212, filed Jun. 15, 2015, the entire contents of which are incorporated herein by reference.

FIELD

Embodiments described herein relate generally to a display device.

BACKGROUND

A mobile terminal (for example, a smartphone, PDA, tablet computer, etc.) is generally equipped with a display device such as a liquid crystal display or an organic electroluminescent display. Recently, an additional function such as a touch sensor function has been added to the display device.

In some liquid crystal display devices having the touch sensor function, a touch sensor is operated in blank periods of liquid crystal drive. Since a panel drive load in display drive periods (hereinafter referred to as display periods) is greatly different from that in sense periods of the touch sensor (hereinafter referred to as non-display periods) in this type of liquid crystal display device, a booster circuit and a regulator of the liquid crystal display device cannot follow a load change and noise is thus produced in a power source voltage. The noise may have various detrimental effects on the liquid crystal display device.

BRIEF DESCRIPTION OF THE DRAWINGS

FIG. 1 is an overall block diagram of a mobile terminal to which an embodiment is applied.

FIG. 2 shows main circuit blocks of FIG. 1.

FIG. 6 shows an example of a block configuration inside a liquid crystal driver IC1 of the embodiment.

FIG. 7 shows a configuration example of a power supply unit inside the liquid crystal driver IC1 of FIG. 6.

FIG. 10 is a timing chart showing variations in potential of a switching element SEL and a switching element XSEL and variations in power source voltages VGHO and VGLO in a display period DWT and a non-display period TDT in the case where a noise suppression circuit is not provided in a pixel signal output circuit.

FIG. 12 shows a first example of noise suppression circuits N and N'. FIG. 13 shows a second example of the noise suppression circuits N and N'.

DETAILED DESCRIPTION

Figure 3:
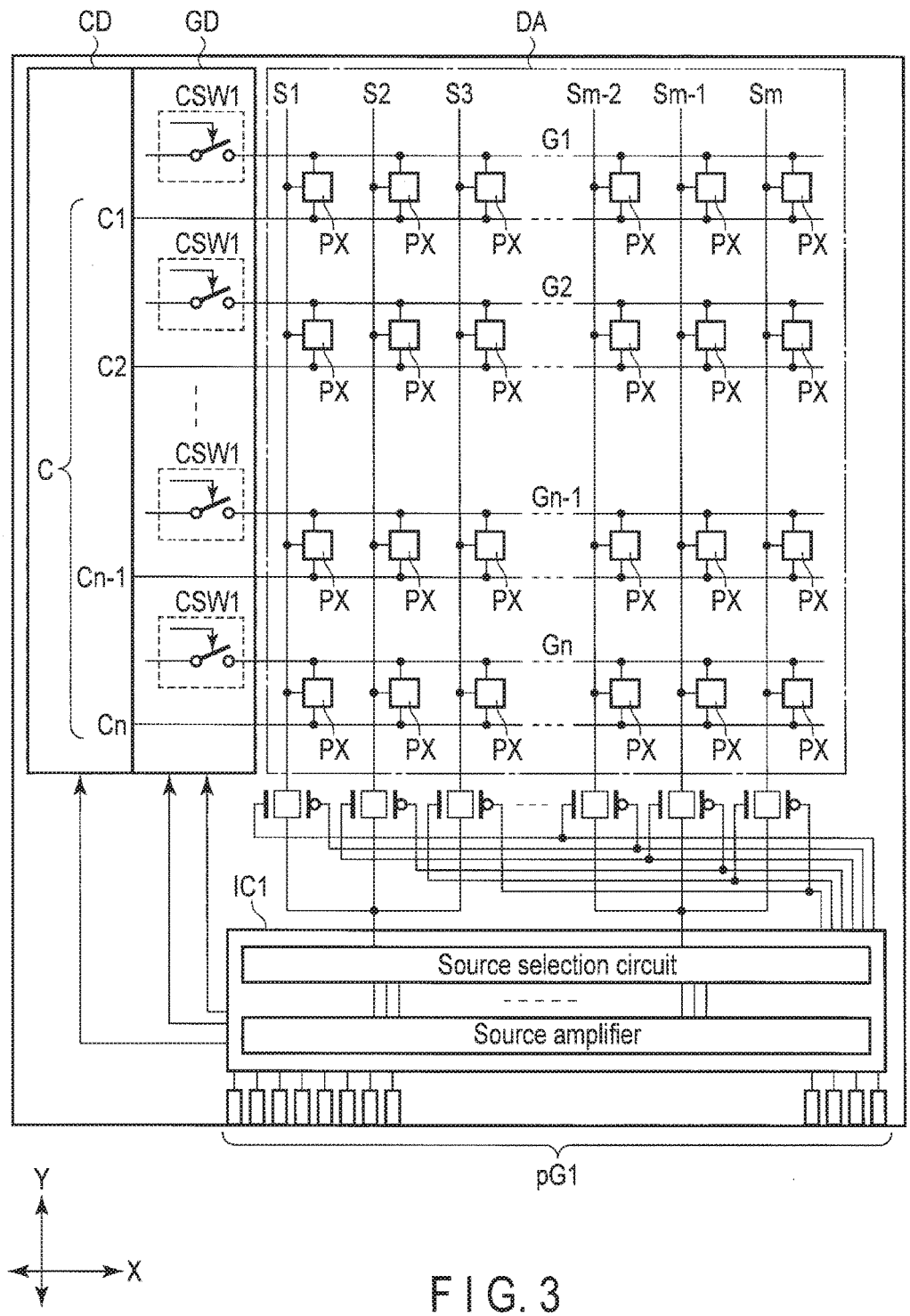
FIG. 3 schematically shows a part of an equivalent circuit on a first substrate of a liquid crystal display panel.

In general, according to one embodiment, a display device includes a display panel, switching elements, a power supply, a controller and a noise suppression circuit. The display panel displays an image. The switching elements supply a pixel signal to the display panel. The power supply supplies a power source voltage to the switching elements. The controller switches between a display period during which the display panel displays an image and a non-display period during which the display panel does not display an image. The noise suppression circuit preliminarily reduces a potential difference between the switching elements and the power supply when the controller switches between the display period and the non-display period.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example and adds no restrictions to the interpretation of the invention. In the drawings, reference numbers of continuously-arranged elements equivalent or similar to each other are omitted in some cases. Besides, in the specification and drawings, elements equivalent or similar to those described in connection with preceding drawings are denoted by the same reference numbers and their detailed descriptions are omitted unless otherwise necessary.

FIG. 1 is an overall block diagram of a mobile terminal to which an embodiment is applied. In FIG. 1, a touch sensor incorporated liquid crystal display panel LCD includes a first substrate SUB1, a second substrate SUB2 opposed to the first substrate SUB1 and a liquid crystal layer formed between the first substrate SUB1 and the second substrate SUB2. The first substrate SUB1 and the second substrate SUB2 may also be called an array substrate and a counter-substrate, respectively. A liquid crystal driver IC1 configured to drive the liquid crystal display panel LCD is mounted on the first substrate SUB1. The liquid crystal driver IC1 may also be called a first IC chip or a drive circuit.

The liquid crystal display panel LCD integrally comprises, for example, a capacitive touch sensor SE in a display area (also called an active area) DA. The touch sensor SE is constituted by common electrodes C (to be described later) provided on the first substrate SUB1 and touch detection electrodes (also called touch detection elements) Rx provided on the second substrate SUB2. This type of touch sensor SE is called an in-cell touch sensor. The principle of operation of the in-cell touch sensor SE will be described later. The touch detection elements Rx can be formed by using a transparent material such as indium tin oxide (ITO) or fine metal lines ranging from several nanometers to several tens of nanometers in thickness so as not to interfere with liquid crystal display.

The touch sensor SE is driven by a drive signal from the liquid crystal driver IC1. An output signal of the touch sensor SE is detected by a touchpanel controller IC2 (also called a second IC chip or a sensor circuit).

The liquid crystal display panel LCD is electrically connected to an application processor (also called a first control unit) HOS. More specifically, the application processor HOS is connected to the liquid crystal display panel LCD through a flexible printed circuit board FPC1 and the liquid crystal driver IC1, and connected to the touch sensor SE through a flexible printed circuit board FPC2 and the touchpanel controller IC2. The liquid crystal driver IC1 and the touchpanel controller IC2 are electrically connected to and synchronized with each other by a timing pulse, etc. The liquid crystal driver IC1 and the touchpanel controller IC2 may be formed on the same chip.

A backlight unit BL configured to illuminate the liquid crystal display panel LCD is provided below the second substrate SUB2. A flexible printed circuit board FPC3 connects the backlight unit BL to the application processor HOS.

FIG. 2 shows main circuit blocks of FIG. 1. An area surrounded by dashed lines in FIG. 2 is the first substrate SUB1. A gate drive circuit GD is formed, for example, in a left area of a non-display area of the first substrate SUB1. The gate drive circuit GD is configured to drive gate lines G (G1 to Gn). The gate lines G are shown in FIG. 3. A common electrode drive circuit CD is provided adjacent to the gate drive circuit GD. The common electrode drive circuit CD is configured to drive the common electrodes C (C1 to Cn). The common electrodes C are shown in FIG. 3. FIG. 2 and FIG. 3 shows the case where the gate drive circuit GD is formed on one side, but gate drive circuits GD may be formed on both sides of the display area DA. In this case, a gate drive circuit GD on one side (for example, gate drive circuit GD on the right side of the display area DA) drives gate lines G1, G3, . . . in odd-numbered rows of the gate lines G1 to Gn, and a gate drive circuit GD on the other side (for example, gate drive circuit GD on the left side of the display area DA) drives gate lines G2, G4, . . . in even-numbered rows of the gate lines G1 to Gn.

The liquid crystal driver IC1 controls the gate drive circuit GD, the common electrode drive circuit CD, etc. The liquid crystal driver IC1 also writes pixel signals to pixels PX (also called display elements) in the display area DA.

The touchpanel controller IC2 can process touch detection signals Rxs obtained from the touch detection elements Rx and obtain coordinate data of a touch position of an object such as the user's finger on the display surface of the liquid crystal display panel LCD. The liquid crystal driver IC1 intercommunicates with the application processor HOS to require and receive data.

The application processor HOS supplies the panel driver IC1 with video data, a command, a synchronization signal, etc.

FIG. 3 schematically shows a part of an equivalent circuit on the first substrate SUB1 of the liquid crystal display panel LCD. The liquid crystal display panel LCD has the display area DA in which an image is displayed. In a non-display area surrounding the display area DA, the liquid crystal driver IC1, the gate drive circuit GD, the common electrode drive circuit CD and a group of outer lead bonding pads (hereinafter referred to as an OLB pad group) pG1 are formed.

The liquid crystal driver IC1 includes a source selection circuit MUP and a source amplifier. The liquid crystal driver IC1 is connected to the gate drive circuit GD, the common electrode drive circuit CD and the OLB pad group pG1. The liquid crystal driver IC1 and the gate drive circuit GD are connected via a control line for outputting a panel control signal, which is not entirely shown. The liquid crystal driver IC1 can provide a control signal to control switching elements CSW1 via the control line.

In the display area DA, the first substrate SUB1 includes gate lines G (G1 to Gn) extending in a first direction X and source lines S (S1 to Sm) extending in a second direction Y crossing the first direction X. The gate lines G (G1 to Gn) are arranged in the second direction Y at predetermined intervals. The source lines S (S1 to Sm) are arranged in the first direction X at predetermined intervals.

In the display area DA, pixels PX are formed in areas partitioned by the gate lines G and the source lines S in a plan view. That is, in the display area DA, a matrix of m × n pixels PX is arranged in the first direction X and the second direction Y (m and n are positive integers). Common electrodes C (C1, . . . , Cn) included in the structure of the pixels PX are also formed in the first direction X. The common electrodes C (C1, . . . , Cn) are used as electrodes for driving the pixels PX and also as electrodes for driving the touch sensor SE, which will be described later.

Each gate line G is led out to the outside of the display area DA and connected to the gate drive circuit GD. The gate drive circuit GD includes control switching elements CSW1. The gate lines G (G1, G2, . . . , Gn) are connected to the control switching elements CSW1, respectively.

Each source line S (S1 to Sm) crosses the gate lines G (G1, G2, . . . , Gn) in a plan view. The source lines S are arranged in the first direction X at predetermined intervals. The source lines S (S1 to Sm) are led out to the outside of the display area DA and connected to the source selection circuit MUP.

The common electrodes C (C1, C2, . . . , Cn) are strip-shaped, extend in the first direction X and are spaced apart in the second direction Y. As a result, the common electrodes C (C1, C2, . . . , Cn) extend along the gate lines G (G1, G2, . . . , Gn) and cross the source lines S (S1 to Sm) in a plan view. Otherwise, the common electrodes C may be formed in respective pixel areas and coupled through auxiliary lines. The common electrodes C extend along the gate lines G and cross the source lines S in a plan view in the present embodiment, but may extend along the source lines S and cross the gate lines G in a plan view.

For example, the common electrodes C may be divisional electrodes which are bundles of several (for example, three) electrodes. For example, the common electrodes C (C1 to Cn) are formed as n/3 divisional electrodes C ((C1 to Cn)/3).

The common electrodes C are led out to the outside of the display area DA and connected to the common electrode drive circuit CD. The gate lines G, the source lines S and the common electrodes C do not necessarily extend linearly as in the drawings and may be partially bent.

The gate drive circuit GD includes n control switching elements CSW1. Each of the n control switching elements CSW1 can be selectively turned on and off to control permission and prohibition of writing an image signal to the corresponding pixel PX.

A pixel signal is concurrently written to pixels PX connected to a selected gate line via the source selection circuit MUP.

Figure 4:
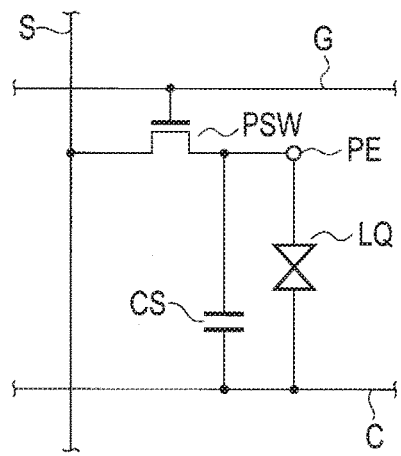
FIG. 4 shows an equivalent circuit of one of pixels PX of FIG. 3.

FIG. 4 is an equivalent circuit diagram showing one of the pixels PX shown in FIG. 3. The pixel PX includes a pixel switching element PSW, a transparent pixel electrode PE, a transparent common electrode C, etc., formed on the first substrate SUB1. The pixel switching element PSW is realized by, for example, a thin-film transistor (TFT). The pixel switching element PSW is electrically connected to the gate line G and the source line S. The pixel switching element PSW may be either a top- or bottom-gate TFT. A semiconductor layer of the pixel switching element PSW is formed of, for example, polysilicon, but may be formed of amorphous silicon.

The pixel electrode PE is electrically connected to the pixel switching element PSW. The pixel electrode PE is formed of ITO and opposed to the common electrode C through an insulating film. The common electrode C, the insulating film and the pixel electrode PE form a storage capacitor CS. When the pixel switching element PSW is turned on by a control signal from the gate line G, a pixel signal output from the source selection circuit MUP to the source line S is written to the storage capacitor CS and stored. Optical space modulation of liquid crystal LQ between the pixel electrode PE and the common electrode C can be realized depending on a voltage generated in the storage capacitor CS. FIG. 4 shows one pixel PX as a representative, but when one of the control switching elements CSW1 shown in FIG. 2 is turned on, pixel switching elements PSW of respective pixels connected to the corresponding gate line G are concurrently turned on. Accordingly, a pixel signal from a source line S connected to each of these pixel switching element PSW is written to a storage capacitor CS of the corresponding pixel PX.

Figure 5A:
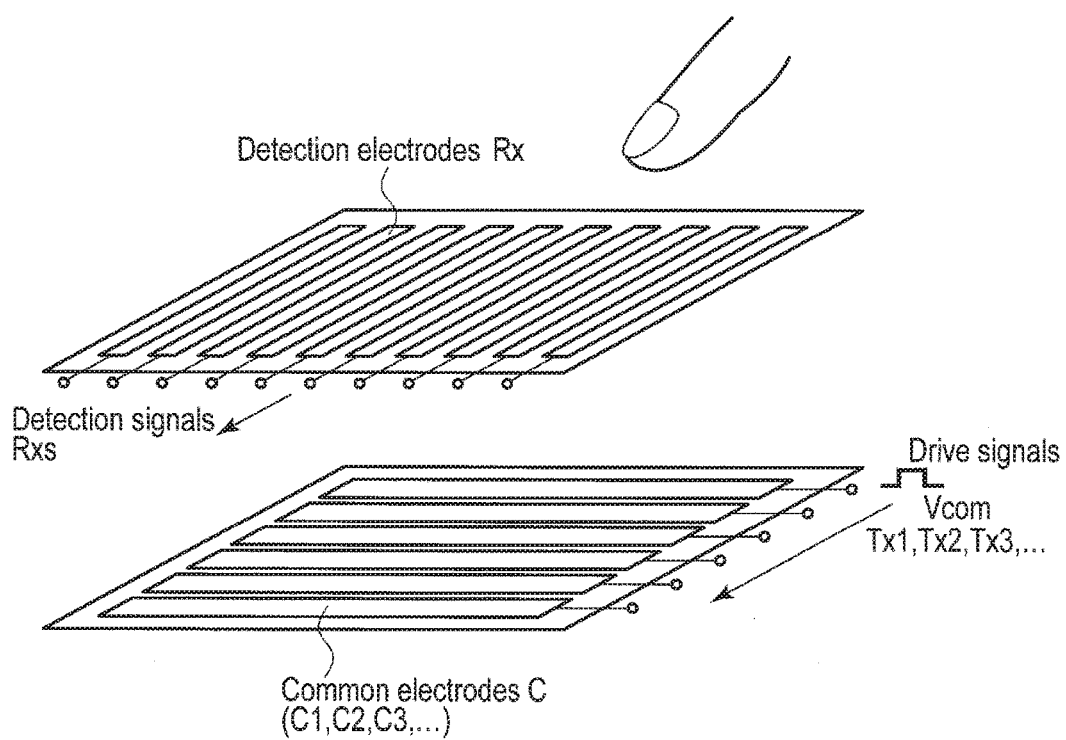
FIG. 5A shows an example of a basic structure of a mutual detection touch sensor SE.
Figure 5B:
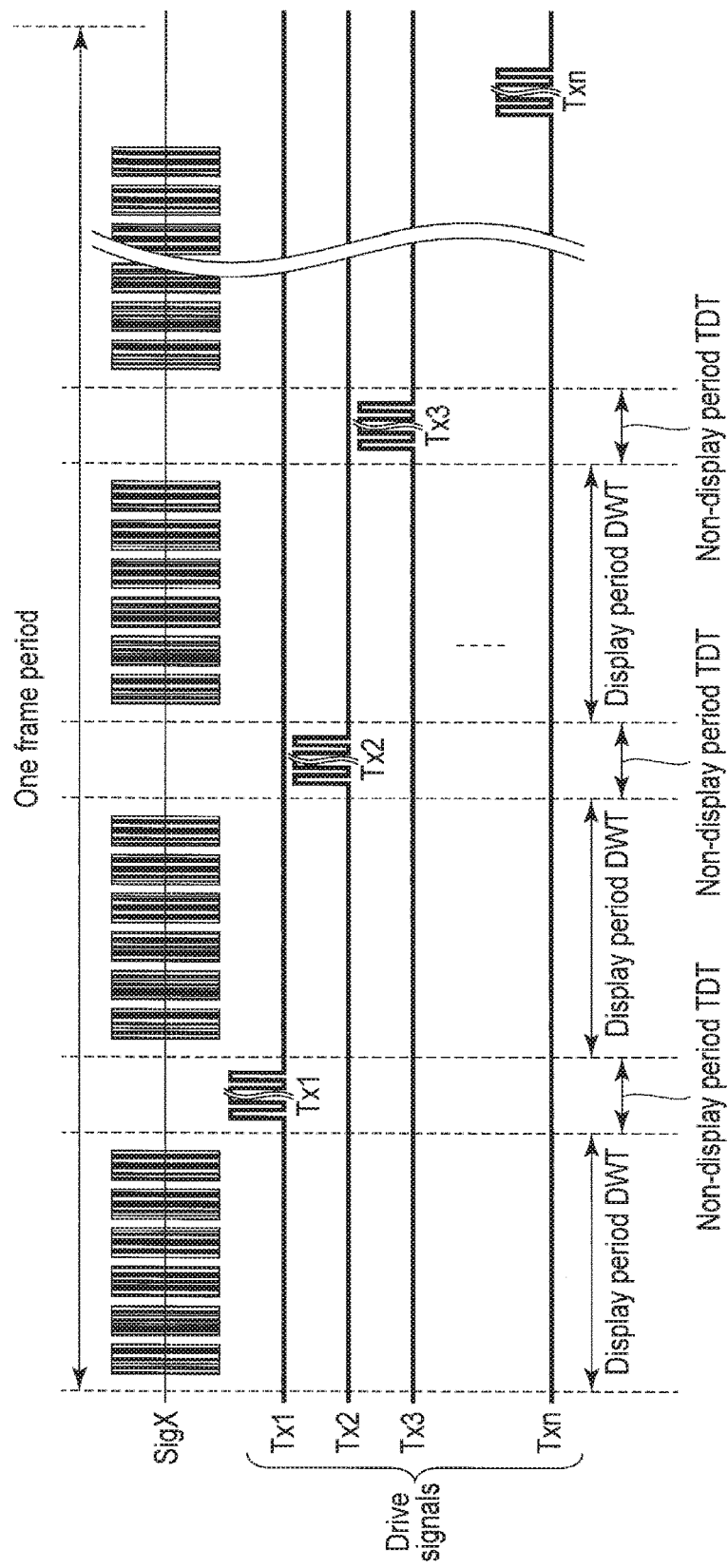
FIG. 5B is a timing chart showing a relationship between drive timings of the touch sensor SE of FIG. 5A and display periods.

FIG. 5A and FIG. 5B show basic operation of the in-cell touch sensor SE.

FIG. 5A shows a mutual (mutual capacitance) detection touch sensor SE. The touch detection elements Rx are formed like stripes in the second direction Y on the second substrate SUB2. The common electrodes C (C1, C2, C3, . . . ) are formed on the first substrate SUB1. The touch detection elements Rx cross the common electrodes C (C1, C2, C3, . . . ).

The common electrodes C1, C2, C3, . . . are sequentially driven by radiofrequency pulse drive signals Tx1, Tx2, Tx3, . . . in non-display periods TDT to be described later. In the periods, a touch detection signal Rxs of a level lower than the output from the other touch detection elements Rx is detected from a touch detection element Rx close to an object such as a finger. This is because a second capacitance occurs between the finger and the touch detection electrode Rx close to the finger in addition to a first capacitance which occurs between this touch detection electrode Rx and the common electrodes. The second capacitance does not occur and only the first capacitance occurs between the other touch detection electrodes Rx and the common electrodes.

Positional coordinates of the finger can be determined based on timings of driving the common electrodes C1, C2, C3, . . . and a position of a touch detection electrode Rx that outputs a detection signal Rxs of a low level.

FIG. 5B shows a timing chart when the common electrodes C (C1, C2, C3, . . . ) are driven by the drive signals Txs1, Txs2, Txs3, . . . . . As shown in FIG. 5B, one frame period is divided into display periods DWT (including periods of writing pixel signals SigX), and non-display periods TDT are provided between the display periods DWT. In the non-display periods TDT, the common electrodes C (C1, C2, C3, . . . ) are driven by the drive signals Tx1, Tx2, Tx3, . . . .

FIG. 5B shows the case where the common electrodes C are driven by the drive signal Tx1 in the first non-display period TDT, by the drive signal Tx2 in the second non-display period TDT, and by the drive signal Txn in the n$^{th}$ non-display period TDT. However, the common electrodes C may be driven by sequential input of the drive signals Tx1 to Txn in each non-display period TDT. In other words, the common electrodes C may be driven by the sequentially input drive signals Tx1 to Txn in each of the first non-display period TDT, the second non-display period TDT and the nth non-display period TDT.

As shown in FIG. 5B, the display periods DWT and the non-display periods TDT are distributed in one frame period. The basic structure and operation of the in-cell touch sensor SE have been described above.

Next, an example of a block configuration inside the liquid crystal driver IC1 which is an IC chip is described in detail with reference to FIG. 6.

In FIG. 6, video data from the application processor HOS is input to a video memory 202 via an interface receiver 201. The video data read from the video memory 202 is latched into a line latch circuit 203. Video data corresponding to one or more lines of the liquid crystal display panel LCD are latched into the line latch circuit 203.

Video data read from the line latch circuit 203 and corresponding to each pixel PX is subjected to digital-analog conversion in a source amplifier 204, subjected to gamma correction, etc., by the amplifier and thereby becomes a pixel signal. Such pixel signals are written to the pixels PX arrayed in a pixel array 240a of the liquid crystal display panel LCD. More specifically, via the source selection circuit MUP the pixel signals are input to the pixels PX two-dimensionally arrayed in the display area DA. Then, the pixel signals are written to the storage capacitors CS described with reference to FIG. 4.

Blocks such as the video memory 202, the line latch circuit 203, the source amplifier 204 and the source selection circuit MUP may be collectively called a video data processor 241.

A synchronization signal, a command, etc., from the application processor HOS are imported by the interface receiver 201. The synchronization signal imported by the interface receiver 201 is input to a timing controller 213. The command imported via the interface receiver 201 is temporarily input to a resister (not shown) and interpreted, and the result is reflected in timing pulse generation, etc., of the timing controller 213. The interface receiver 201 converts an external clock rate of digital data transmitted from the application processor HOS into an internal clock rate for internal digital data. For example, write operation of the interface receiver 201 is synchronized with the external clock and read operation of the interface receiver 201 is synchronized with the internal clock.

The timing controller 213 may be constituted by logic circuits and an application controlling the logic circuits, or by hardware including logic circuits, counters, etc. The timing controller 213 can set an operation mode and an operation sequence of the liquid crystal driver IC1 and switch the operation mode. As the operation mode, there are a display period DWT including a write period during which pixel signals are written to pixels of each horizontal line, a non-display period TDT, etc. Therefore, the timing controller 213 can refer to an external horizontal synchronization signal HSYNC from the interface receiver 201 and be synchronized with the external horizontal synchronization signal HSYNC. The timing controller 213 generates various timing pulses for various operations based on the internal clock from the oscillator 214.

Various timing pulses for display control output from the timing controller 213 are input to the video memory 202, the line latch circuit 203, the source amplifier 204, the source selection circuit MUP and a panel control signal generator 220. Various timing pulses for sensor from the timing controller 213 are input to a touch detection element control signal generator 231 and a touch interface 232.

The panel control signal generator 220 generates drive signals for the gate drive circuit GD and the common electrode drive circuit CD and realizes video display by the liquid crystal display panel LCD.

The touch detection element control signal generator 231 supplies drive signals Tx1, Tx2, Tx3, . . . to the common electrodes C. The touchpanel controller IC2 and the touch interface 232 are electrically connected to each other and their operation timings are synchronized with each other. That is, the touchpanel controller IC2 recognizes the non-display period TDT and receives the detection signals Rxs in the non-display period TDT. The touchpanel controller IC2 communicates with the touch detection element control signal generator 231 via the touch interface 232 and recognizes the operation status of the touch detection element control signal generator 231 (for example, drive status of the touch detection elements).

In the above configuration, blocks such as the panel control signal generator 220, the touch detection element control signal generator 231, the timing controller 213 and the oscillator 241 may be collectively called a scan drive unit 242. The scan drive unit 242 includes a second clock generator (oscillator 214) and sequentially supplies the pixel signals and the display drive signals to the display elements in a time-division manner in synchronization with the clock of the second clock generator execute a display scan. The scan drive unit 242 also supplies the drive signal for touch detection to the touch detection elements.

In the above configuration, blocks such as the touch interface 232 and the touchpanel controller IC2 may be collectively called a touch detection unit 243. The touch detection unit 243 can execute touch detection by sampling detection signals Rxs from the touch detection elements Rx.

The liquid crystal driver IC1 includes a regulator 251 and a booster circuit (also called a charge pump) 252 as a power supply unit for the internal circuit. For example, as shown in FIG. 7($a$), the regulator 251 receives power supply from a battery BATT, generates a drive voltage by an output amplifier 251A and stably outputs the drive voltage. The regulator 251 can selectively import several (for example, two) potential voltages from the battery BATT. That is, the regulator 251 includes a switch 251B and the amplifier 251A for output stabilization, and switches and selects an input potential by a control signal in the switch 251B. The drive voltage output from the regulator 251 is transmitted to the interface receiver 201, the video memory 202, the line latch circuit 203, the timing controller 213 and the oscillator 214. The booster circuit 252 is realized by, for example, a DC/DC converter. As shown in FIG. 7($b$), the booster circuit 252 receives the power supply from the regulator 251, increases a DC voltage to a predetermined voltage by controlling a voltage increasing frequency, and outputs the voltage to the source selection circuit MUP, the source amplifier 204, the panel control signal generator 220 and the touch detection element control signal generator 231. Each circuit block thereby operates properly in the liquid crystal driver IC1.

A functional structure of noise suppression circuits incorporated into the display device of the embodiment is described. In a general display device (liquid crystal display device), the touch sensor is operated in periodically occurring blank periods (non-display periods) of liquid crystal drive. Since a panel drive load in display periods is greatly different from that in non-display periods, there is a possibility that a load change periodically occurs. At this time, a booster circuit and a regulator for liquid crystal drive cannot follow the load change and noise (ripple) is thus produced in a power source voltage. If the cycle of the noise overlaps the zone of audibility, sound may be produced.

Figure 8:
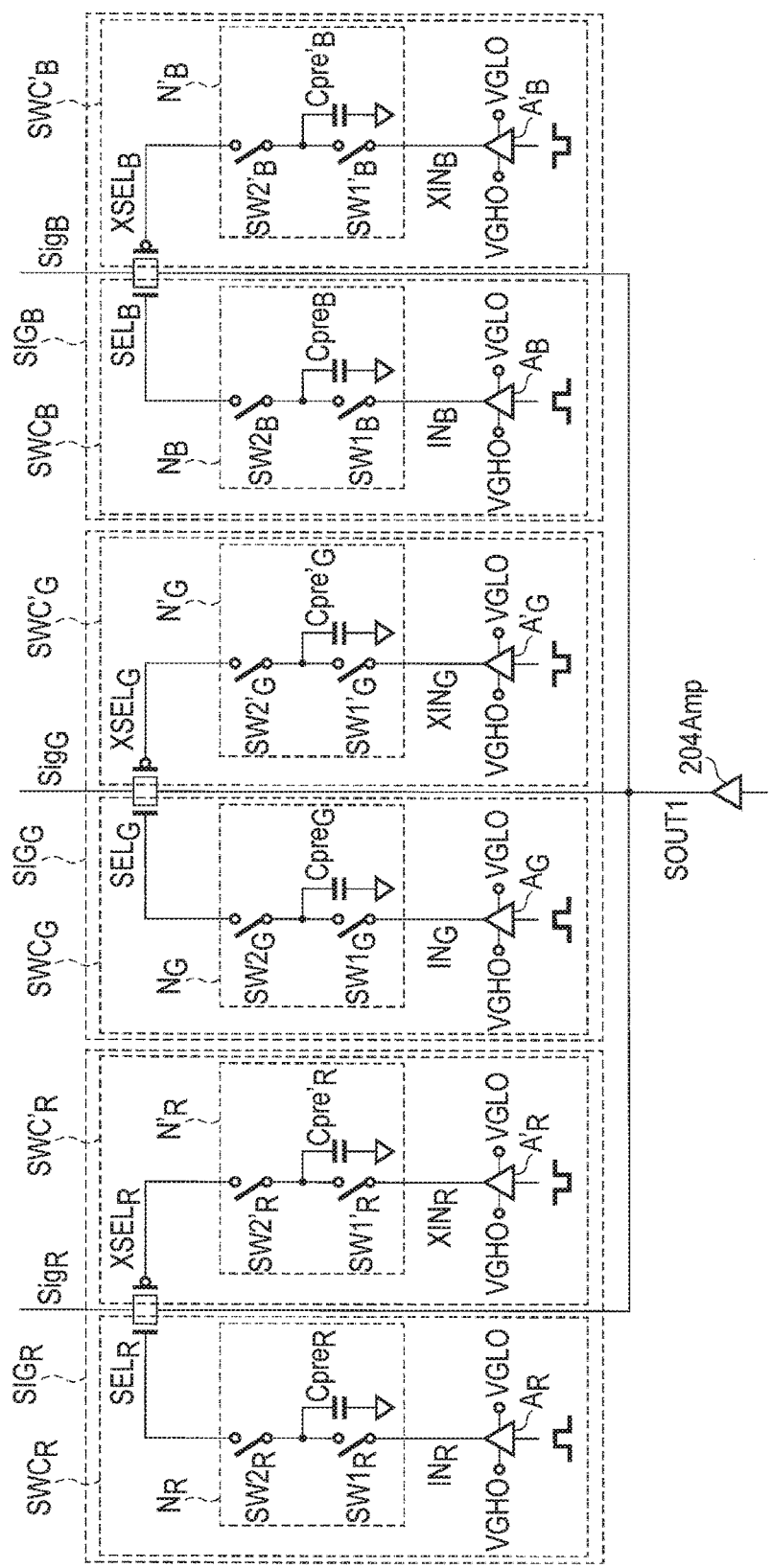
FIG. 8 shows a configuration example of pixel signal output circuits.

Therefore, as shown in FIG. 8, noise suppression circuits N ($N_R$, $N'_R$, $N_G$, $N'_G$, $N_B$, $N'_B$) for reducing the noise are provided in the display device of the present embodiment. The noise suppression circuits N are included in pixel signal output circuits SIG ($SIG_R$, $SIG_G$, $SIG_B$) which output pixel signals corresponding to red (R), green (G) and blue (B) pixels PX, respectively. More specifically, the noise suppression circuits N are included in first switching control circuits SWC ($SWC_R$, $SWC_G$, $SWC_B$) and second switching control circuits SWC' ($SWC'_R$, $SWC'_G$, $SWC'_B$) constituting the pixel signal output circuits SIG. As a representative example, noise suppression circuits $N_R$ and $N'_R$ included in a first switching control circuit $SWC_R$ and a second switching control circuit $SWC'_R$ constituting a pixel signal output circuit $SIG_R$ are described with reference to FIG. 8. In the present embodiment, pixels PX corresponding to red, green and blue are described as an example, but pixels PX corresponding to white (W) may be further provided. Furthermore, a pair of switching control circuits SWC and SWC' is used as a pixel signal output circuit SIG, but the pixel signal output circuit SIG may be constituted by either of these switching control circuits.

The first switching control circuit $SWC_R$ includes an amplifier circuit $A_R$, a noise suppression circuit $N_R$ and a switching element $SEL_R$. When a positive polarity timing pulse output from the timing controller 213 is input to a signal input terminal, the amplifier circuit $A_R$ is driven by a voltage supplied from the booster circuit 252. The switching element $SEL_R$ is turned on and off by supply of positive power source voltages (VGHO and VGLO) output from the amplifier circuit $A_R$. The noise suppression circuit $N_R$ is provided between the amplifier circuit $A_R$ and the switching element $SEL_R$. The noise suppression circuit $N_R$ has a function of suppressing (reducing) noise produced in the power source voltages by approximating a potential near the switching element $SEL_R$ to a potential on the output side of the amplifier circuit $A_R$ as much as possible. The noise suppression circuit $N_R$ includes two switches $SW1_R$ (first switch) and $SW2_R$ (second switch) connected in series so as to connect the amplifier circuit $A_R$ to the switching element $SEL_R$. The noise suppression circuit $N_R$ also includes a capacitor $Cpre_R$ provided between the two switches $SW1_R$ and $SW2_R$. The two switches SW1 and SW2 are turned on and off according to the timing pulse output from the timing controller 213.

The second switching control circuit $SWC'_R$ includes an amplifier circuit $A'_R$, a noise suppression circuit $N'_R$ and a switching element $XSEL_R$. When a negative polarity timing pulse output from the timing controller 213 is input to a signal input terminal, the amplifier circuit $A'_R$ is driven by a voltage supplied from the booster circuit 252. The switching element $XSEL_R$ is turned on and off by supply of negative power source voltages (VGHO and VGLO) output from the amplifier circuit $A'_R$. The noise suppression circuit $N'_R$ is provided between the amplifier circuit $A'_R$ and the switching element $XSEL_R$. The noise suppression circuit $N'_R$ has a function of suppressing noise produced in the power source voltages by approximating a potential near the switching element $XSEL_R$ to a potential on the output side of the amplifier circuit $A'_R$ as much as possible. The noise suppression circuit $N'_R$ includes two switches $SW1'_R$ (first switch) and $SW2'_R$ (second switch) connected in series so as to connect the amplifier circuit $A'_R$ to the switching element $XSEL_R$. The noise suppression circuit $N'_R$ also includes a capacitor Cpre'$_R$ provided between the two switches SW1'$_R$ and SW2'$_R$. The two switches SW1'$_R$ and SW2'$_R$ are turned on and off according to the timing pulse output from the timing controller 213.

Figure 9:
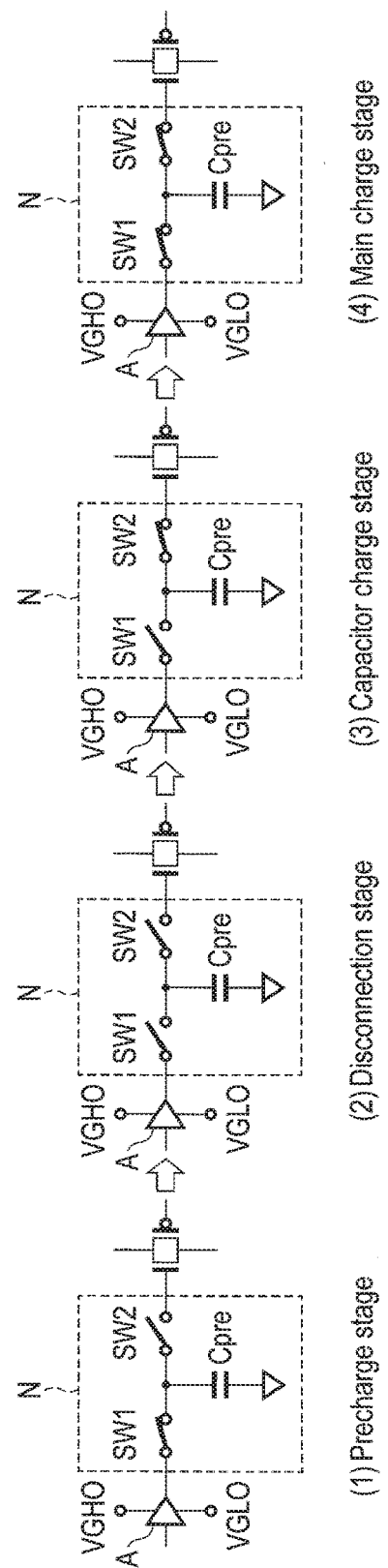
FIG. 9 shows a switching procedure of switches of a noise suppression circuit included in the pixel signal output circuit.

Next, a switching procedure of the switches SW1 and SW2 (switches SW1' and SW2') executed for causing the noise suppression circuit N (noise suppression circuit N') to function like a small power source is described with reference to FIG. 9. As shown in FIG. 9, the operation of the noise suppression circuit N can be roughly classified into four operation stages, i.e., (1) a precharge stage, (2) a disconnection stage, (3) a capacitor charge stage and (4) a main charge stage. A switching procedure of the switches SW1 and SW2 in the four stages is hereinafter described with reference to FIG. 9.

First, in the precharge stage (1), only the switch SW1 is turned on. Next, in the disconnection stage (2), both the switches SW1 and SW2 are turned off. Then, in the capacitor charge stage (3), only the switch SW2 is turned on. Finally, in the main charge stage (4), both the switches SW1 and SW2 are turned on. The capacitor provided in the noise suppression circuit N can function like a small power source by switching the switches SW1 and SW2 in the above switching procedure while the amplifier circuit A operates and the power source voltages are output from the amplifier circuit A. A detailed operation of the noise suppression circuit N will be described later with reference to FIG. 11.

Next, variations in potential of the switching element SEL and the switching element XSEL and variations in the power source voltages VGHO and VGLO in the display period DWT and the non-display period TDT in the case where the noise suppression circuit N is not provided in the pixel signal output circuit SIG is described with reference to the timing chart of FIG. 10. FIG. 10 shows one of display periods DWT and one of non-display periods TDT distributed in one frame period.

Since pixel signals are sequentially written to pixels PX connected to one source line in the display period DWT, the switching element SEL of the first switching control circuit SWC and the switching element XSEL of the second switching control circuit SWC' are repeatedly turned on and off. Since the potential of the switching element SEL is high when positive power source voltages are supplied to the switching element SEL so as to turn on the switching element, and is low when positive power source voltages are not supplied so as to turn off the switching element, the potential varies as shown in FIG. 10. In the same manner, since the potential of the switching element XSEL is low when the negative power source voltages are supplied to the switching element XSEL so as to turn on the switching element, and is high when the negative power source voltages are not supplied so as to turn off the switching element, the potential varies as shown in FIG. 10. The power source voltages VGHO and VGLO are originally direct currents and should be expressed by solid lines in FIG. 10. However, the power source voltages VGHO and VGLO vary according to turning on and off of the switching element SEL and the switching element XSEL and repeat waveform changes in response to the variations of the switching elements SEL and XSEL as shown in FIG. 10. Such waveforms become noise.

Since no pixel signal is written to the pixels PX in the non-display period TDT, the switching element SEL of the first switching control circuit SWC and the switching element XSEL of the second switching control circuit SWC' are in the off-state. In other words, no power source voltage is supplied to the switching element SEL and the switching element XSEL and thus their potentials remain unchanged. Since the power source voltages VGHO and VGLO are not supplied to the switching element SEL and the switching element XSEL as stated above, the waveforms of the power source voltages VGHO and VGLO also remain unchanged.

Next, operation of the switching control circuit SWC and operation of the switching control circuit SWC' of the display device of the present embodiment are described with reference to the timing chart of FIG. 11.

Figure 11:
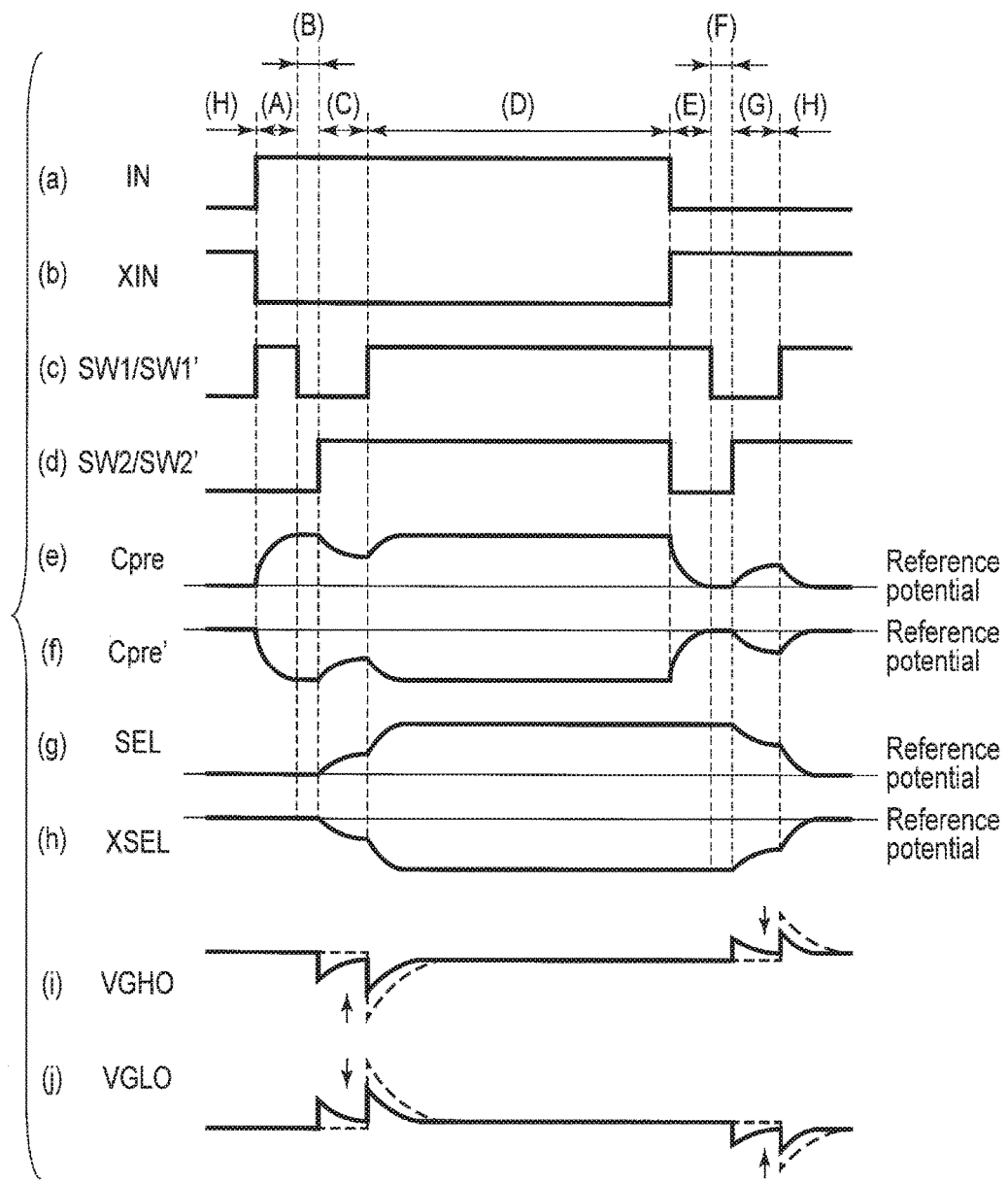
FIG. 11 is a timing chart showing operation of a switching control circuit SWC and operation of a switching control circuit SWC' of the present embodiment.

In FIG. 11, (a) to (d) show waveforms of timing pulses output from the timing controller 213 to the amplifier circuit A, the amplifier circuit A', the switches SW1 and SW1' and the switches SW2 the SW2', respectively; (e) to (h) show variations in potential of the capacitor Cpre, the capacitor Cpre', the switching element SEL and the switching element XSEL, respectively; and (i) and (j) show variations in the power source voltages VGHO and VGLO supplied to the switching element SEL and the switching element XSEL.

First, in a period (A) of FIG. 11, a positive polarity timing pulse is input to the amplifier circuit A as shown by (a). In the same period, a negative polarity timing pulse is input to the amplifier circuit A' as shown by (b). Further, in the same period, the switches SW1 and SW1' are turned on as shown by (c). That is, in the period (A) of FIG. 11, the first switching control circuit SWC is in a state where the amplifier circuit A operates, the switch SW1 is in the on-state and the switch SW2 is in the off-state. Further, in the period (A) of FIG. 11, the second switching control circuit SWC' is in a state where the amplifier circuit A' operates, the switch SW1' is in the on-state and the switch SW2' is in the off-state. That is, the state of each of the switching control circuits SWC and SWC' in the period (A) of FIG. 11 corresponds to the precharge stage (1) in FIG. 9.

In this case, since the positive polarity timing pulse is input, the potential of the amplifier circuit A in the first switching control circuit SWC increases to exceed a reference potential. Accordingly, the potential of the capacitor Cpre increases from the reference potential to a first potential as shown by (e). Since the switch SW2 is in the off-state and the switching element SEL is not connected to the amplifier circuit A or the capacitor Cpre in this period as described above, the potential of the switching element SEL remains at the reference potential as shown by (g).

Since the negative polarity timing pulse is input, the potential of the amplifier circuit A' in the second switching control circuit SWC' decreases to fall below the reference potential. Accordingly, the potential of the capacitor Cpre' decreases from the reference potential to a third potential as shown by (g). Since the switch SW2' is in the off-state and the switching element XSEL is not connected to the amplifier circuit A' or the capacitor Cpre' in this period as described above, the potential of the switching element XSEL remains at the reference potential as shown by (h).

Next, in a period (B) of FIG. 11, the switches SW1 and SW1' are turned off as shown by (c). That is, in the period (B) of FIG. 11, the first switching control circuit SWC is in a state where the amplifier circuit A operates and both the switches SW1 and SW2 are in the off-state. Further, in the period (B) of FIG. 11, the second switching control circuit SWC' is in a state where the amplifier circuit A' operates and both the switches SW1' and SW2' are in the off-state. That is, the state of each of the switching control circuits SWC and SWC' in the period (B) of FIG. 11 corresponds to the disconnection stage (2) in FIG. 9.

In this case, since the capacitor Cpre in the first switching control circuit SWC is not connected to the amplifier circuit A or the switching element SEL, the potential of the capacitor Cpre remains unchanged from the preceding period (A) as shown by (e). In the same manner, since the switching element SEL is not connected to the amplifier circuit A or the capacitor Cpre, the potential of the switching element SEL remains unchanged from the preceding period (A) as shown by (g).

Since the capacitor Cpre' in the second switching control circuit SWC' is not connected to the amplifier circuit A' or the switching element XSEL, the potential of the capacitor Cpre' remains unchanged from the preceding period (A) as shown by (f). In the same manner, since the switching element XSEL is not connected to the amplifier circuit A' or the capacitor Cpre', the potential of the switching element XSEL remains unchanged from the preceding period (A) as shown by (h).

Following that, in a period (C) of FIG. 11, the switches SW2 and SW2' are turned on as shown by (d). That is, in the period (C) of FIG. 11, the first switching control circuit SWC is in a state where the amplifier circuit A operates, the switch SW1 is in the off-state and the switch SW2 is in the on-state. Further, in the period (C) of FIG. 11, the second switching control circuit SWC' is in a state where the amplifier circuit A' operates, the switch SW1' is in the off-state and the switch SW2' is in the on-state. That is, the state of each of the switching control circuits SWC and SWC' in the period (C) of FIG. 11 corresponds to the capacitor charge stage (3) in FIG. 9.

In this case, the potential of the capacitor Cpre in the first switching control circuit SWC is higher than the reference potential as described above (see the description of the period (A)). Accordingly, the potential of the capacitor Cpre is higher than the potential of the switching element SEL, which is equal to the reference potential. Therefore, the potential of the capacitor Cpre and the potential of the switching element SEL are changed to the same potential (second potential). That is, the potential of the capacitor Cpre decreases from the first potential to the second potential as shown by (e) and the potential of the switching element SEL increases from the reference potential to the second potential as shown by (g).

The potential of the capacitor Cpre' in the second switching control circuit SWC' is lower than the reference potential as described above (see the description of the period (A)). Accordingly, the potential of the capacitor Cpre' is lower than the potential of the switching element XSEL, which is equal to the reference potential. Therefore, the potential of the capacitor Cpre' and the potential of the switching element XSEL are changed to the same potential (fourth potential). That is, the potential of the capacitor Cpre' increases from the third potential to the fourth potential as shown by (f) and the potential of the switching element XSEL decreases from the reference potential to the fourth potential as shown by (h).

Next, in a period (D) of FIG. 11, the switches SW1 and SW1' are turned on as shown by (c). That is, in the period (D) of FIG. 11, the first switching control circuit SWC is in a state where the amplifier circuit A operates and both the switches SW1 and SW2 are in the on-state. Further, in the period (D) of FIG. 11, the second switching control circuit SWC' is in a state where the amplifier circuit A' operates and both the switches SW1' and SW2' are in the on-state. That is, the state of each of the switching control circuits SWC and SWC' in the period (D) of FIG. 11 corresponds to the main charge state (4) in FIG. 9.

In this case, the potential of the capacitor Cpre and the switching element SEL in the first switching control circuit SWC is lower than the potential of the amplifier circuit A as described above (see the descriptions of the periods (A) to (C)). Therefore, the potential of the capacitor Cpre increases from the potential in the preceding period (C) and is maintained at a particular level (i.e., increases from the second potential to the first potential) as shown by (e). The potential of the switching element SEL also increases from the potential in the preceding period (C) and is maintained at the particular level (i.e., increases from the second potential to the first potential) as shown by (g).

The potential of the capacitor Cpre' and the switching element XSEL in the second switching control circuit SWC' is higher than the potential of the amplifier circuit A' as described above (see the descriptions of the periods (A) to (C)). Therefore, the potential of the capacitor Cpre' decreases from the potential in the preceding period (C) and is maintained at a particular level (i.e., decreases from the fourth potential to the third potential) as shown by (f). The potential of the switching element XSEL also decreases from the potential in the preceding period (C) and is maintained at the particular level (i.e., decreases from the fourth potential to the third potential) as shown by (h).

Following that, in a period (E) of FIG. 11, the amplifier circuit A is turned off as shown by (a). The amplifier circuit A' is also turned off as shown by (b). The switches SW2 and SW2' are further turned off as shown by (d). That is, the first switching control circuit SWC is in a state where the amplifier circuit A does not operate, the switch SW1 is in the on-state and the switch SW2 is in the off-state. Further, the second switching control circuit SWC' is in a state where the amplifier circuit A' does not operate, the switch SW1' is in the on-state and the switch SW2' is in the off-state. That is, the state of each of the switching control circuits SWC and SWC' in the period (E) of FIG. 11 corresponds to the precharge stage (1) shown in FIG. 9 at the time of discharge.

In this case, since the amplifier circuit A in the first switching control circuit SWC does not operate, the potential of the amplifier circuit A decreases from the potential in the preceding period (D) (in other words, the period during which the amplifier circuit A operates). Accordingly, the potential of the capacitor Cpre decreases from the first potential to the reference potential as shown by (e). Since the switch SW2 is in the off-state and the switching element SEL is not connected to the amplifier circuit A or the capacitor Cpre in this period as described above, the potential of the switching element SEL remains unchanged from the preceding period (D).

Since the amplifier circuit A' in the second switching control circuit SWC' does not operate, the potential of the amplifier circuit A' increases from the potential in the preceding period (D) (in other words, the period during which the amplifier circuit A' operates). Accordingly, the potential of the capacitor Cpre' increases from the third potential to the reference potential as shown by (f). Since the switch SW2' is in the off-state and the switching element XSEL is not connected to the amplifier circuit A' or the capacitor Cpre' in this period as described above, the potential of the switching element XSEL remains unchanged from the preceding period (D).

Next, in a period (F) of FIG. 11, the switches SW1 and SW1' are turned off as shown by (c). That is, the first switching control circuit SWC is in a state where the amplifier circuit A does not operate and both the switches SW1 and SW2 are in the off-state. Further, the second switching control circuit SWC' is in a state where the amplifier circuit A' does not operate and both the switches SW1' and SW2' are in the off-state. That is, the state of each of the switching control circuits SWC and SWC' in the period (F) of FIG. 11 corresponds to the disconnection stage (2) shown in FIG. 9 at the time of discharge.

In this case, since the capacitor Cpre in the first switching control circuit SWC is not connected to the switching element SEL, the potential of the capacitor Cpre remains unchanged from the preceding period (E) as shown by (e). In the same manner, since the switching element SEL is not connected to the capacitor Cpre, the potential of the switching element SEL remains unchanged from the preceding period (E) as shown by (g).

Since the capacitor Cpre' in the second switching control circuit SWC' is not connected to the switching element XSEL, the potential of the capacitor Cpre' remains unchanged from the preceding period (E) as shown by (f). In the same manner, since the switching element XSEL is not connected to the capacitor Cpre', the potential of the switching element XSEL remains unchanged from the preceding period (E) as shown by (h).

Following that, in a period (G) of FIG. 11, the switches SW2 and SW2' are turned on as shown by (d). That is, the first switching control circuit SWC is in a state where the amplifier circuit A does not operate, the switch SW1 is in the off-state and the switch SW2 is in the on-state. Further, the second switching control circuit SWC' is in a state where the amplifier circuit A' does not operate, the switch SW1' is in the off-state and the switch SW2' is in the on-state. That is, the state of each of the switching control circuits SWC and SWC' in the period (G) of FIG. 11 corresponds to the capacitor charge stage (3) shown in FIG. 9 at the time of discharge.

In this case, since the capacitor Cpre in the first switching control circuit SWC is connected to the switching element SEL remaining at the high potential from the period (D), the potential of the capacitor Cpre and the potential of the switching element SEL are changed the same potential (second potential). That is, the potential of the capacitor Cpre increases from the reference potential to the second potential as shown by (e) and the potential of the switching element SEL decreases from the first potential to the second potential as shown by (g).

Since the capacitor Cpre' in the second switching control circuit SWC' is connected to the switching element XSEL remaining at the low potential from the period (D), the potential of the capacitor Cpre' and the potential of the switching element XSEL are changed to the same potential (fourth potential). That is, the potential of the capacitor Cpre' decreases from the reference potential to the fourth potential as shown by (f) and the potential of the switching element XSEL increases from the third potential to the fourth potential as shown by (h).

Finally, in a period (H) of FIG. 11, the switches SW1 and SW1' are turned on as shown by (c). That is, the first switching control circuit SWC is in a state where the amplifier circuit A does not operate and both the switches SW1 and SW2 are in the on-state. Further, the second switching control circuit SWC' is in a state where the amplifier circuit A' does not operate and both the switches SW1' and SW2' are in the on-state. That is, the state of each of the switching control circuits SWC and SWC' in the period (H) of FIG. 11 corresponds to the main charge stage (4) shown in FIG. 9 at the time of discharge.

In this case, since a normal output voltage is supplied to the capacitor Cpre and the switching element SEL in the first switching control circuit SWC because of the non-operating amplifier circuit A, the potential of the capacitor Cpre and the switching element SEL decreases from the second potential to the reference potential as shown by (e) and (g).

Since a normal output voltage is supplied to the capacitor Cpre' and the switching element XSEL in the second switching control circuit SWC' because of the non-operating amplifier circuit A', the potential of the capacitor Cpre' and the switching element XSEL decreases from the fourth potential to the reference potential as shown by (f) and (h).

The above process in the periods (A) to (H) of FIG. 11 is repeatedly executed at the switching between the display period DWT and the non-display period TDT.

According to the above-described embodiment, a structure of supplying a voltage to the switching element SEL (switching element XSEL), which is turned on and off to write pixel signals to pixels PX, by using a precharged capacitor before power source voltages are supplied to the switching element SEL (switching element XSEL) is provided. Therefore, a potential difference between the output side of the amplifier circuit A (amplifier circuit A') which supplies the power source voltages and the switching element SEL (switching element XSEL) can be reduced when the power source voltages are supplied. In addition, as shown by (i) and (j) of FIG. 11, noise produced when the power source voltages are supplied to the switching element SEL (switching element XSEL) can be suppressed (reduced). In (i) and (j) of FIG. 11, solid lines express noise in the power source voltages in the case of the present embodiment where the noise suppression circuits N and N' are included, and broken lines express noise in the power source voltages in the case where the noise suppression circuits N and N' are not included.

The noise suppression circuit may be driven in response to the first drive of the pixel signal output circuit SIG when the non-display period is switched to the display period or in response to the last drive of the pixel signal output circuit SIG when the display period is switched to the non-display period. Alternatively, the noise suppression circuit may be driven in response to drive of all or some of the pixel signal output circuits in the display period.

(First Example)

A first example of the noise suppression circuits N and N' is described with reference to FIG. 12.

In the first example, the two switches SW1 and SW2 included in the noise suppression circuit N are provided in the liquid crystal driver IC1 and the capacitor Cpre included in the noise suppression circuit N is provided outside the liquid crystal driver IC1. In the same manner, in the first example, the two switches SW1' and SW2' included in the noise suppression circuit N' are provided in the liquid crystal driver IC1 and the capacitor Cpre' included in the noise suppression circuit N' is provided outside the liquid crystal driver IC1. The capacitors Cpre and Cpre' are formed on a substrate which is simultaneously formed in the process of forming the pixel switching element PSW on the first substrate SUB1. The capacitors Cpre and Cpre' may be formed on a unique IC, instead of the substrate which is simultaneously formed in the process of forming the pixel switching element PSW on the first substrate SUB1.

Since the two switches SW1 and SW2 (SW1' and SW2') are provided inside the liquid crystal driver IC1, an advantage in design that a control line connected to the timing controller 213 for controlling the two switches SW1 and SW2 need not be led outside the liquid crystal driver IC1 can be achieved. Further, since the capacitor Cpre (Cpre') is provided outside the liquid crystal driver IC1, an advantage in design that the size of the liquid crystal driver IC1 can be prevented from increasing by providing the capacitor Cpre can also be achieved.

(Second Example)

A second example of the noise suppression circuits N and N' is described with reference to FIG. 13.

In the second example, both the capacitor Cpre and the two switches SW1 and SW2 included in the noise suppression circuit N are provided in the liquid crystal driver IC1. In the same manner, in the second example, both the capacitor Cpre' and the two switches SW' and SW2' included in the noise suppression circuit N' are provided in the liquid crystal driver IC1.

In this example, too, since the two switches SW1 and SW2 (SW1' and SW2') are provided inside the liquid crystal driver IC1, an advantage in design that a control line connected to the timing controller 213 for controlling the two switches SW1 and SW2 need not be led outside the liquid crystal driver IC1 can be achieved.

(Third Example)

Figure 14:
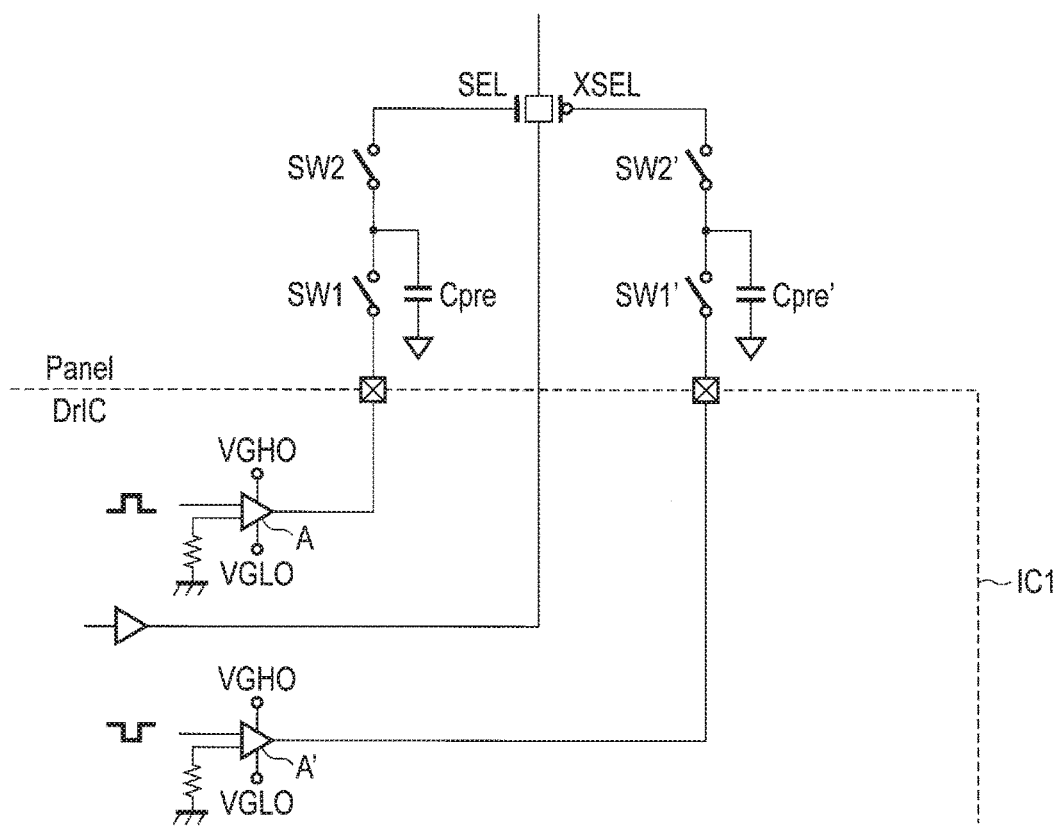
FIG. 14 shows a third example of the noise suppression circuits N and N'.

A third example of the noise suppression circuits N and N' is described with reference to FIG. 14.

In the third example, both the capacitor Cpre and the two switches SW1 and SW2 included in the noise suppression circuit N are provided outside the liquid crystal driver IC1. In the same manner, in the third example, both the capacitor Cpre' and the two switches SW1' and SW2' included in the noise suppression circuit N' are provided outside the liquid crystal driver IC1. The switches SW1, SW2, SW1' and SW2' and the capacitors Cpre and Cpre' are formed on a substrate which is simultaneously formed in the process of forming the pixel switching element PSW on the first substrate SUB1. The switches SW1, SW2, SW1' and SW2' and the capacitors Cpre and Cpre' may be formed on a unique IC, instead of the substrate which is simultaneously formed in the process of forming the pixel switching element PSW on the first substrate SUB1.

In this example, too, since the capacitor Cpre (Cpre') is provided outside the liquid crystal driver IC1, an advantage in design that the size of the liquid crystal driver IC1 can be prevented from increasing by providing the capacitor Cpre can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display panel which displays an image;
switching elements which supply a pixel signal to the display panel;
a power supply which supplies a power source voltage to the switching elements;
a controller which switches between a display period during which the display panel displays an image and a non-display period during which the display panel does not display an image; and
a noise suppression circuit which reduces a potential difference between the switching elements and the power supply when the controller switches between the display period and the non-display period, wherein
the noise suppression circuit comprises:
a pair of switches provided between the switching elements and the power supply; and
a capacitor provided between the pair of switches,
a first switch of the pair of switches connects the power supply and the capacitor, and a second switch of the pair of switches connects the switching elements and the capacitor, the first and second switches being connected in series between the power supply and the switching elements, and
when the controller switches between the display period and the non-display period, the noise suppression circuit precharges the capacitor by switching the pair of switches to allow the power supply to supply the power source voltage to the capacitor and reduces the potential difference between the switching elements and the power supply by using the precharged capacitor.

2. The display device of claim 1, wherein
when the capacitor is precharged, the noise suppression circuit switches the pair of switches to forbid the power supply to supply the power source voltage to the capacitor and the switching elements, further switches the pair of switches to connect the capacitor to the switching elements and reduces the potential difference between the switching elements and the power supply.

3. The display device of claim 2, wherein
when a positive polarity timing pulse is input to the power supply, a potential of the capacitor increases from a reference potential to a first potential, which is higher than the reference potential, by the precharge, and decreases from the first potential to a second potential, which is higher than the reference potential and lower than the first potential, by the connection of the capacitor to the switching elements.

4. The display device of claim 3, wherein
a potential of the switching elements increases from the reference potential to the second potential by the connection of the capacitor to the switching elements.

5. The display device of claim 2, wherein
when a negative polarity timing pulse is input to the power supply, a potential of the capacitor decreases from a reference potential to a third potential, which is lower than the reference potential, by the precharge, and increases from the third potential to a fourth potential, which is lower than the reference potential and higher than the third potential, by the connection of the capacitor to the switching elements.

6. The display device of claim 5, wherein
a potential of the switching elements decreases from the reference potential to the fourth potential by the connection of the capacitor to the switching elements.

7. The display device of claim 1, wherein
the pair of switches is included in a driver which supplies a drive signal to the display panel, and
the capacitor is included in the display panel.

8. The display device of claim 1, wherein
both the pair of switches and the capacitor are included in a driver which supplies a drive signal to the display panel.

9. The display device of claim 1, wherein
both the pair of switches and the capacitor are included in the display panel.

10. The display device of claim 1, wherein
the non-display period is a sense period of a touch sensor provided in the display panel.

11. A display device comprising:
a display panel constituted by pixels;
source lines connected to the pixels;
a source amplifier which converts an input video signal into pixel signals;
switching elements connected to the source lines;
a pixel signal output circuit which sequentially supplies the pixel signals to the source lines in a time-division manner by using the switching elements;
an amplifier circuit which supplies a power source voltage to the switching elements;
a capacitor connected to the switching elements; and
a pair of switches comprising a first switch configured to connect the amplifier circuit and the capacitor, and a second switch configured to connect the switching elements and the capacitor, the first and second switches being connected in series between the amplifier circuit and the switching elements,
wherein an operating period of the display panel is divided into a display period and a non-display period,
the capacitor is charged by the power source voltage in the non-display period, and
the capacitor is discharged when the non-display period is switched to the display period.

12. The display device of claim 11, wherein
the capacitor is connected between the first switch and the second switch,
the first switch is provided near the amplifier circuit, and
the second switch is provided near the switching elements.

13. The display device of claim 12, wherein
the capacitor is charged when the first switch is turned on, and
the capacitor is discharged when the first switch is turned off and the second switch is turned on.

* * * * *